United States Patent
Li et al.

(10) Patent No.: US 8,102,626 B2
(45) Date of Patent: Jan. 24, 2012

(54) DISK DRIVE AND HEAD SLIDER

(75) Inventors: Jianhua Li, Kanagawa (JP); Junguo Xu, Ibaraki (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 608 days.

(21) Appl. No.: 12/288,769

(22) Filed: Oct. 22, 2008

(65) Prior Publication Data

US 2009/0109573 A1 Apr. 30, 2009

(30) Foreign Application Priority Data

Oct. 26, 2007 (JP) ................. 2007-278875

(51) Int. Cl.
*G11B 5/60* (2006.01)
(52) U.S. Cl. ................ 360/235.5; G9B/5.229
(58) Field of Classification Search ........... 360/235.5; G9B/5.229
See application file for complete search history.

(56) References Cited

U.S. PATENT DOCUMENTS

| 6,690,543 B2* | 2/2004 | Kurita et al. ........... 360/234.7 |
| 2003/0095361 A1* | 5/2003 | Shimanouchi et al. .... 360/294.4 |
| 2007/0086112 A1* | 4/2007 | Shimizu et al. ........... 360/234.3 |
| 2008/0170332 A1* | 7/2008 | Shimizu et al. ........... 360/236.6 |

FOREIGN PATENT DOCUMENTS

JP  2003-099910 A  4/2003

* cited by examiner

*Primary Examiner* — Hoai V Ho
(74) *Attorney, Agent, or Firm* — Zilka-Kotab, PC

(57) ABSTRACT

Embodiments of the present invention provide a head slider that suppresses accumulation of lubricant droplets on an air-bearing surface due to a backflow, and thus improves reliability of a disk drive. According to one embodiment, a lubricant droplet being adhered to a head slider and accumulated thereon, which are caused by extremely low flying height of the head slider, are prevented from falling onto a recording medium. When velocity of a recording medium at a position where the head slider faces the recording medium is assumed to be v, step depth $\delta_4$ at an outflow side of an outflow side rail satisfies, $\delta_4 \leqq 0.1125*\log_{10}(v)+0.019$.

19 Claims, 11 Drawing Sheets

DISK DRIVE AND HEAD SLIDER

CROSS-REFERENCES TO RELATED APPLICATIONS

The instant nonprovisional patent application claims priority to Japanese Patent Application No. 2007-278875 filed Oct. 26, 2007 and which is incorporated by reference in its entirety herein for all purposes.

BACKGROUND OF THE INVENTION

A magnetic disk drive used as an information storage device has a magnetic head section having a conversion element read element and/or write element. The write element records and erases data into/from data bits arranged on a circular track of an information recording medium, and the read element reads a magnetic signal recorded by the write element. The magnetic head section is mounted on a slider body section so as to be formed into a head slider. The head slider is connected to a suspension arm. The suspension arm applies a pressing force to the head slider in a direction to the recording medium. When the recording medium is rotated, the head slider flies on an air film formed on the recording medium by rotation of the recording medium.

A surface of the recording medium has a protective layer, which is covered with a lubricating layer, for protecting the magnetic head section from wear and corrosion. When a magnetic space between the magnetic head and the recording medium or flying amount is reduced to improve magnetic recording areal density, the lubricant layer is decreased in thickness to the same level as a monomolecular layer. A monomolecular layer of a lubricant is extremely importantly and is kept at an interface between the head slider and the recording medium in order to keep reliability at the interface between the head slider and the recording medium. Mobility is an key property of the lubricant, as the lubricant should be immobile enough so that it is not easily displaced by slider-disk contacts, but mobile enough that it easily replenishes any placed lubricant.

The head slider has an air-bearing surface facing a recording medium. While the recording medium is rotated, the recording medium drags air under the head slider along the air-bearing surface in a direction approximately parallel to the tangential velocity of the recording medium. As the air passes beneath the air bearing surface, air is compressed to cause a pressure between the disk and the air bearing surface to increase, which creates a hydrodynamics lifting force that counteracts the load force and causes the slider to lift and fly above or in close proximity to the medium surface.

Once the magnetic disk drive is operated, four kinds of forces of hydrodynamic, van der Waals and electrostatic pressures, and air shearing stress, are generated by motion of the bead slider, leading to movement of the lubricating layer. Among the four kinds of force, the air shearing force is the dominant one for movement of a lubricant. The air shearing force moves the lubricant to the bottom of the head slider, and droplets of the lubricant are formed in an interfacial portion between the head and the disk.

In a head slider having an extremely low flying height, it has been found that an extremely strong relationship exists between motion of the lubricant droplets and an air flow on the bottom of the head slider. Most of the lubricant droplets are moved to an outflow end of the head slider by the air shearing force.

To achieve a head slider that operates at a required flying height, a head slider has been designed, which has an air-bearing surface having a special shape on a surface facing a medium. It is now observed that as average flying height of the head slider is continuously decreased, accumulation of the lubricant droplets on the flying surface of the head slider, and contact or falling of a deposited lubricant to/onto the recording medium increasingly cause a read/write error. However, the low-flying head slider has been configured without considering accumulation of the lubricant on a portion near a conversion element section. When the lubricant accumulated on the conversion element section of the head slider contacts to or falls onto the recording medium, the read/write error may be caused as described before. Particularly, if a write error occurs, data may be irreparably lost.

To avoid a phenomenon that a lubricant drawn into a negative pressure groove is accumulated on a stepped portion at an outflow end, and the accumulated lubricant gradually grows into a large droplet, and eventually contacts to or falls onto a surface of a recording medium, Japanese Patent Publication No. 2003-99910 describes a head slider in which an intermediate step is provided between a step bearing surface and a negative pressure groove surface to reduce height of the stepped portion, on which the lubricant may be accumulated, so that accumulated amount is decreased.

Thickness of the lubricant is now decreased to an atom level for a low magnetic spacing between the conversion element section of the head slider and the recording medium in order to increase recording density. Moreover, flying height of the head slider is also reduced in order to reduce the magnetic spacing. The magnetic spacing has been thus reduced, and thereby pressure on the conversion element section has been increased, as a result, droplets of the lubricant are now easily accumulated on the conversion element section due to a backflow from an outflow end of the head slider.

Figure 5:
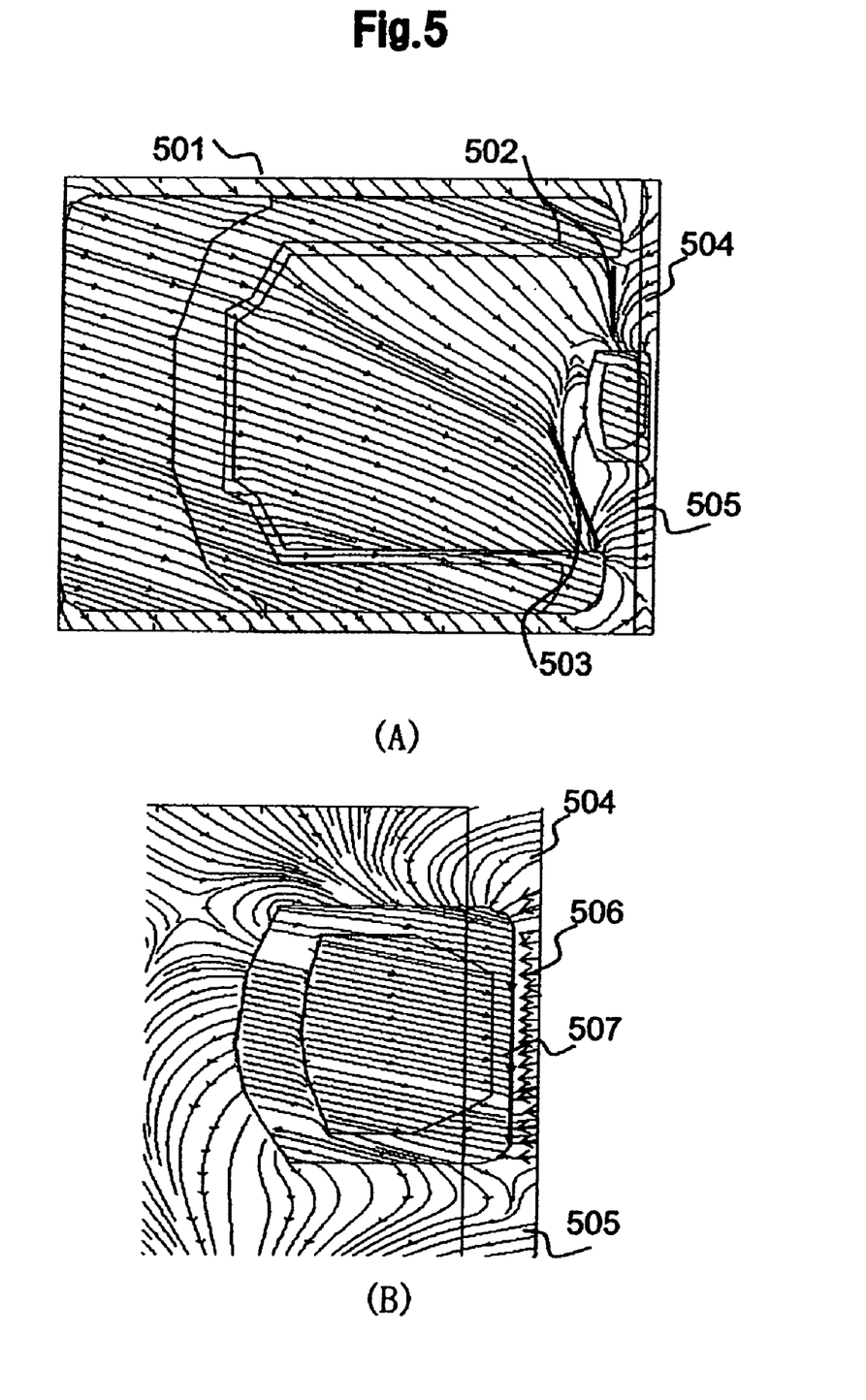
FIGS. 5(A) and 5(B) are examples of a flow in a portion near an air-bearing surface of a previous head slider.

FIGS. 5A and 5B show a flow on an air-bearing surface of a previous head slider. In the head slider, backflows 504 and 505 from an outflow end occur near both side portions of an outflow side rail. Stagnation line 502 and 503 are found, at which a flow to be generated has a velocity of zero in the length direction of the head slider due to the backflows respectively, thereby a flow rate near the center rail having the conversion element section is decreased. Furthermore, the position 502 is connected to the outflow side rail, and the droplets of the lubricant are led to the outflow side rail along such a connection line.

In a recent head slider, a structure is found, in which when the magnetic spacing is reduced, the outflow side rail is provided while avoiding reaching the outflow end of the head slider to prevent contact of the outflow end of the head slider to a recording medium. Particularly, when a heater is provided in a head section to thermally expand a portion near a write/read element section so as to be protruded from a flying surface, the rail is often provided while avoiding reaching the outflow end of the head slider to prevent contact of the flying surface of the expanded rail to the medium.

In this way, when a rail section is provided in a manner of avoiding reaching the outflow end of the head slider, a backflow 506 from the outflow end occurs even at a wake side from the rail section having a write/read element mounted thereon. Droplets of the lubricant, which are led to the outflow side rail by the backflow 506, flow as shown by 507 along the outflow end of the outflow side rail, and then the droplets are accumulated on a corner of the outflow side rail. Today, it is known that when the accumulated droplets fall from the end of the outflow side rail, oscillation occurs in the head slider, leading to an error during recording/reproducing.

To increase recording density without reducing reliability of a magnetic disk drive, flying amount of the head slider needs to be decreased, and control needs to be performed to suppress accumulation of the lubricant droplets on the outflow end of the conversion element section of the head slider due to the backflow from the outflow end of the head slider.

BRIEF SUMMARY OF THE INVENTION

Embodiments of the present invention provide a head slider that suppresses accumulation of lubricant droplets on an air-bearing surface due to a backflow, and thus improves reliability of a disk drive. According to the embodiment of FIG. 1, a lubricant droplet 407 being adhered to a head slider 109 and accumulated thereon, which are caused by extremely low flying height of the head slider 109, are prevented from falling onto a recording medium 103. When velocity of a recording medium 103 at a position where the head slider 109 faces the recording medium is assumed to be v, step depth $\delta_4$ at an outflow side of an outflow side rail 207 satisfies, $\delta_4 \leq 0.1125 * \log_{10}(v) + 0.019$.

DETAILED DESCRIPTION OF THE INVENTION

Embodiments of the present invention relate to an information storage device such as a magnetic disk drive, and particularly relate to a technique for suppressing accumulation of lubricant droplets or particles on a surface of a head slider, and suppressing their falling from a place near a conversion element in the head slider onto a medium, in order to improve reliability of the device.

Embodiments of the invention provide a head slider in which the lubricant droplets are not or slightly accumulated in a pad having a conversion element section, so that falling of the droplets onto a recording medium is suppressed, leading to improvement in reliability of a drive.

A magnetic disk drive according to embodiments of the invention has a recording medium to be rotated, and a head slider arranged in a manner of facing a surface of the recording medium, wherein the head slider has a rail surface, on which a read element for reading data recorded in the recording medium and/or a write element for recording data into the recording medium are/is mounted, on a flying surface at a side opposed to the recording medium, and when velocity of a recording medium at a position where the head slider faces the recording medium is assumed to be v, depth from the rail surface to a position of an outflow end of the flying surface is not more than, $0.1125 * \log_{10}(v) + 0.019$.

Preferably, the head slider has step surfaces, which are deeper than the rail surface, at an inflow end side of the rail surface and at sides thereof, and further has a negative pressure groove surface, which is deeper than pad surfaces, at an inflow side of the step surfaces, an inflow side rail enclosing an inflow side and both side portions of the negative pressure groove surface, and side rails provided between both side portions of the inflow side rail and a conversion element, and width of the step surfaces is wider than width of the negative pressure grooves at respective places where the side rails are provided.

Preferably, length of a side end of each pad surface is made to be two to three times longer than that of a head section having the conversion element mounted thereon.

Moreover, the bead slider according to embodiments of the invention has a rail surface, on which a conversion element is mounted, provided at an outflow end side of a flying surface, step surfaces, which are deeper than the rail surface, provided at an inflow end side of the rail surface and at both sides thereof, and pad surfaces, which are deeper than the rail surface, provided at both sides of the step surfaces, wherein depth from the rail surface to a flying surface at a position of the outflow end is made to be 0.15 μm or less.

According to the above configuration, a head slider may be provided, which suppresses accumulation of droplets of a lubricant on an air-bearing surface due to a backflow, and thus improves reliability of a disk drive.

Figure 1:
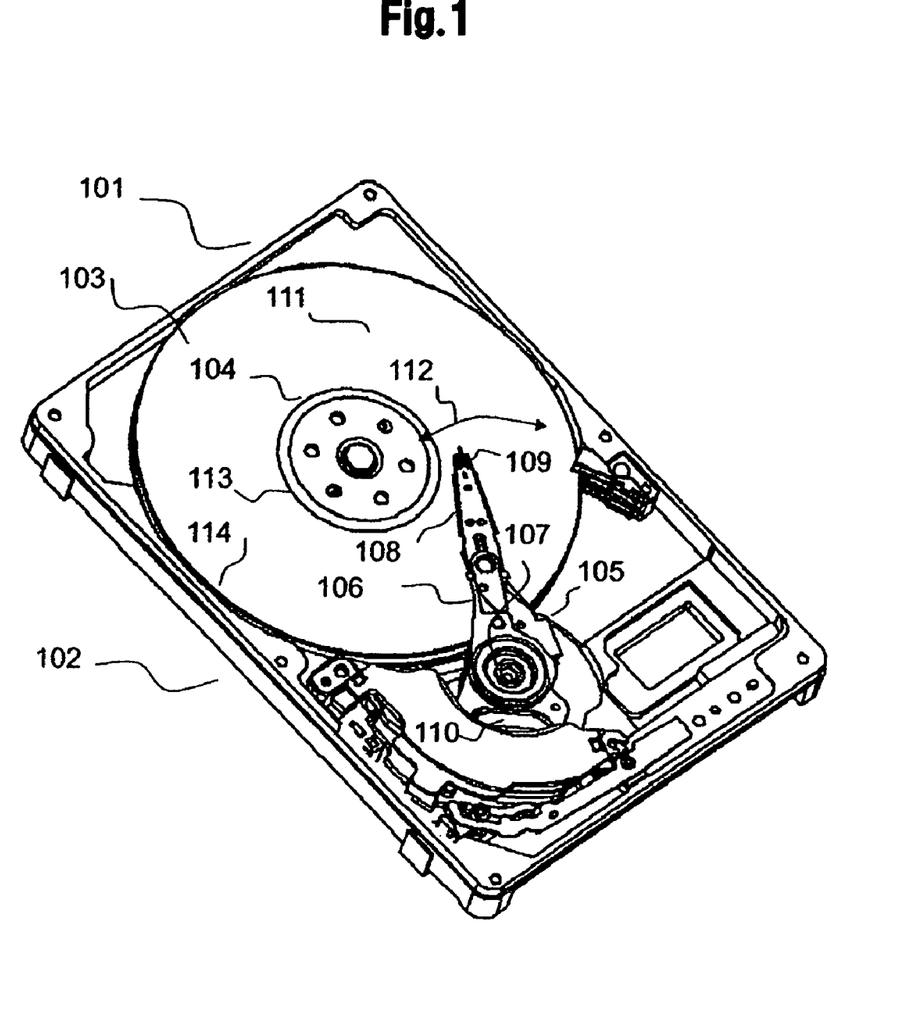
FIG. 1 is an exemplary schematic diagram of a magnetic disk drive.

FIG. 1 shows an exemplary schematic diagram showing a magnetic disk drive 101 being an information storage device used for a computer system as an example of a disk drive using the invention. The magnetic disk drive 101 has at least one magnetic disk 103 as a recording medium within a base 102 or an outer casing. The magnetic disk 103 is fixed to a spindle motor 104 at a central portion and thus rotated. An actuator 105 has a plurality of parallel actuator arms 106 formed in a comb shape, and mounted on the base 102 in a manner of being freely pivoted by a pivot assembly 107.

A magnetic head section having a conversion element 211, which includes a magnetic write element for recording data into the magnetic disk 103 and/or a magnetic read element for reading data recorded in the magnetic disk 103, is mounted on a slider body section, so that the magnetic head section is formed into a head slider 109. The head slider 109 is fixed to a flexure. The flexure is flexibly bonded to an end of a suspension 108. The suspension 108 has a spring property, and applies bias (pressing load) to the head slider 109 and thereby presses the head slider in a direction to the magnetic disk 103 so that the head slider 109 flies with an accurate distance from the magnetic disk 103. A voice coil motor 110 rotates the actuator 105 so that the head slider 109 provided on a tip of the suspension 108 is moved along a trajectory 112, thereby a magnetic head on the head slider 109 is situated on a desirable data track from the inner circumference 113 of the magnetic disk 103 to the outer circumference 114 thereof.

A perfluoropolyether (PFPE) film 111 is coated by dipping on a carbon protective layer on a surface of the magnetic disk 103 in order to protect the magnetic disk 103 from wear and corrosion. As the perfluoropolyether film, for example, "PFPE Z", "PFPE Zdol", "PFPE Z tetraol", or "ZDMD (Z-dol multidentate)" or "ZTMD (Z-Tetraol multidentate)" being a multidentate lubricating oil is appropriately given.

The magnetic disk 103 is rotated while dragging air on its surface. Since a flow way is narrowed in a space between a bottom of the head slider 109 and a surface of the magnetic disk 103, air is compressed therein, and consequently increased pressure is applied to the bottom of the head slider 109. Such pressure induces hydrodynamic lifting force, which relatively counteracts the load force provide by the suspension 108, thereby the head slider 109 is raised, and allowed to fly on the surface of the magnetic disk with being extremely close to the magnetic disk surface.

The air drawn by rotation of the magnetic disk 103 induces shearing stress in a lubricant 111 on the surface of the magnetic disk 103. The lubricant separated from the surface of the magnetic disk 103 by the shearing stress forms droplets in the magnetic disk drive 101. The droplets partially adhere to the bottom of the head slider 109.

Figure 2:
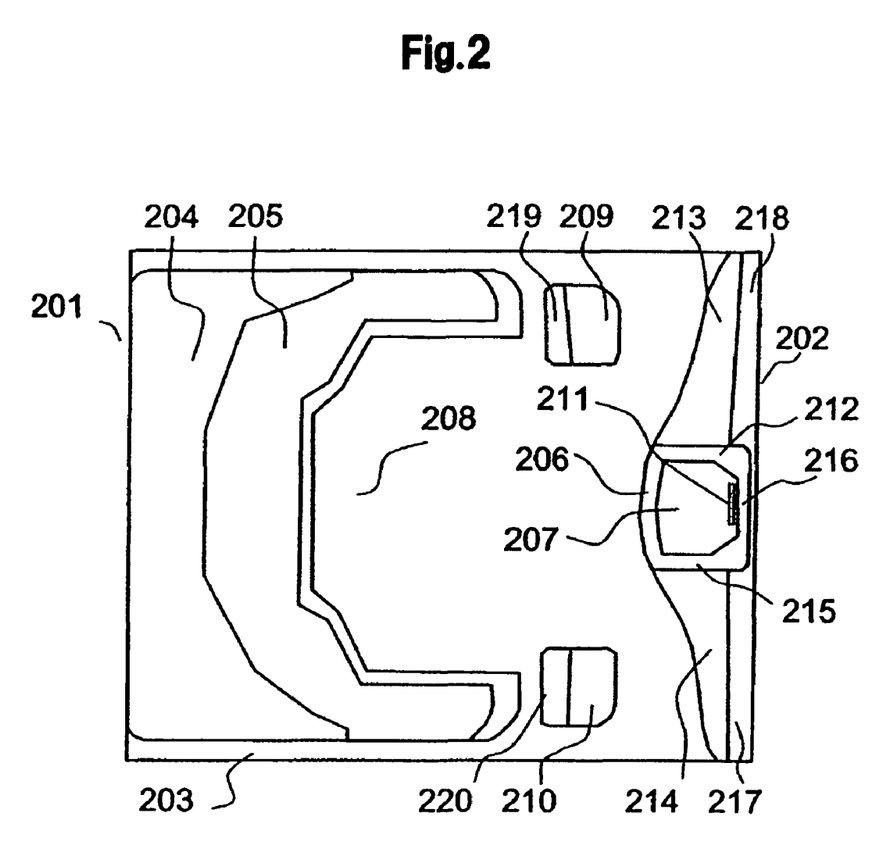
FIG. 2 is an exemplary plane diagram of an example of a magnetic head slider of a first embodiment.
Figure 3:
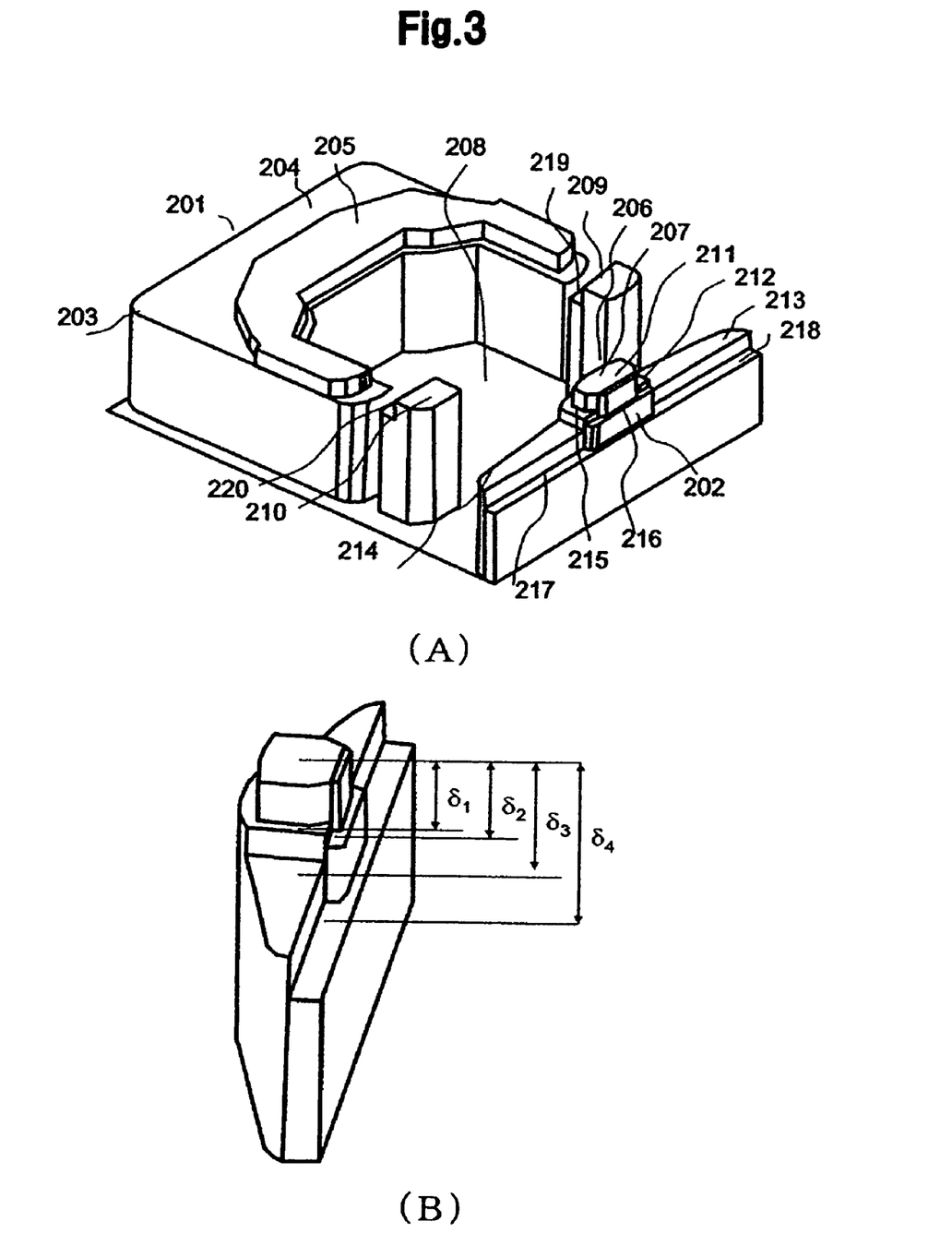
FIGS. 3(A) and 3(B) are exemplary perspective diagrams of the example of the magnetic head slider of the first embodiment.

FIG. 2 shows an exemplary perspective diagram of an example of a magnetic head slider of a first embodiment. FIG. 3(A) shows an exemplary perspective diagram of FIG. 2, and FIG. 3B shows a perspective diagram of an outflow end portion of the magnetic head slider shown in FIG. 2.

The magnetic head slider of the first embodiment has an air inflow end 201, air outflow end 202, and air bearing surface 203. The air bearing surface 203 has an inflow side step (shallow groove) surface 204, an inflow side rail 205 having an inflow side rail surface, an outflow side rail 207 having an outflow side rail surface and a conversion element 211, an outflow side step surface 206, a negative pressure groove 208, side rails 209 and 210, each side rail forming an air bearing surface of a head slider side face, side step surfaces 219 and 220 provided at outflow end sides of respective side rails, and flow pads 213 and 214 provided over full width of the head slider.

A surface of the inflow side rail 205 and a surface of the outflow side rail 207 are on the same plane, each of which is a reference surface of depth of the air bearing surface 203. Air flowing between the head slider 109 and the magnetic disk 103 generates a fluid pressure by which the head slider 109 flies on the magnetic disk 103. At that time, a surface of the inflow side rail 205 and a surface of the outflow side rail 207 acts as rail surfaces that generate positive pressure respectively.

The inflow side step surface 204 and the outflow side step surface 206 are also on a same plane, which are formed at an inflow side of the inflow side rail 205 and at an inflow side of the outflow side rail 207 respectively. Air flows from the air inflow end 201 into a gap formed between the head slider 109 and the magnetic disk 103, and partially flows along the inflow side step surface 204 and the outflow side step surface 206. The air is compressed by portions of the step surfaces. The compressed air flows along the inflow side rail 205 and the outflow side rail 207, thereby positive pressure is generated on the surface of the inflow side rail 205 and the surface of the outflow side rail 207 respectively.

Length of the outflow side step surface 206 for generating a sufficient high positive pressure, which is necessary for the head slider to fly from the magnetic disk 103, is 50 μm or more, and preferably 100 μm or more.

Each of the side step surfaces 219 and 220 is on the same plane as the inflow side step surface 204, and formed at an inflow side of each of the side rails 209 and 210. Part of the air, which has flown from the air inflow end 201 into the gap formed between the head slider 109 and the magnetic disk 103, flows along the inflow side step surface 204 and the side step surfaces 219 and 220. Pressure on each of the side rails 209 and 210 is increased by the air that has flown into the gap, leading to increase in air stiffness in a roll direction.

The outflow end face 216 is, in design, made to have the same depth as each of outflow-end side step surfaces 212 and 215 having the same height as the outflow side step surface 206. However, while a portion of the outflow end face 216 includes alumina, portions of the outflow-end side step surfaces 212 and 215 are formed of Al2O3-TiC, therefore the end face 216 is actually different in depth from the surfaces 212 and 215 by an effect of difference in etching ratio caused by the materials. Similarly, stepped surfaces 217 and 218 are, in design, made to have the same depth as the flow pads 213 and 214. However, while portions of the stepped surfaces 217 and 218 include alumina, portions of the flow pads 213 and 214 are formed of $Al_2O_3$—TiC, therefore the stepped surfaces are actually different in depth from the flow pads by an effect of difference in etching ratio caused by the materials. Similarly, stepped surfaces 217 and 218 are, in design, made to have the same depth as the flow pads 213 and 214. However, while portions of the stepped surfaces 217 and 218 include alumina, portions of the flow pads 213 and 214 are formed of $Al_2O_3$—TiC, therefore the stepped surfaces are actually different in depth from the flow pads by an effect of difference in etching ratio caused by the materials.

The flow pads 213, 214 and stepped surfaces 217 and 218 prevent generation of negative pressure in a region near the outflow end of the air-bearing surface, and generates a small positive pressure instead, thereby they locally change flow velocity distribution on the air-bearing surface, so that suppress backflow causing accumulation of lubricating oil on a bottom of the head slider as described later.

Depth of the negative pressure groove 208 from a surface including the inflow side step surface 204 is about 800 nm. Depth of the negative pressure groove 208 from a surface including the inflow side rail 205 is about 1 μm.

FIG. 3(B) shows exemplary grooves near an outflow end compared with a write/read element (magnetic head) of the head slider of the first embodiment. In the embodiment, the grooves near the outflow end compared with the write/read element is designed and manufactured to be in a stepped shape by using the difference in etching ratio caused by materials.

Depth $\delta_1$ shows depth from the highest outflow side rail 207 to the outflow-end side step surfaces 212 and 215 having the same height as that of the outflow side step surface 206. Depth $\delta_2$ shows depth from the outflow side rail 207 to the outflow end face 216. Depth $\delta_3$ shows depth from the outflow side rail 207 to the stepped surfaces 213 and 214, while depth $\delta_4$ shows depth from the outflow side rail 207 to the stepped surfaces 217 and 218.

The head slider of the first embodiment is applied to a head slider in so-called pico size (about 1250*1000*300 μm) or femto size (about 850*700*230 μm), but may be applied to a head slider in atto size (about 850*500*180 μm), and the head slider may be made of ceramics or an intermetallic compound.

Hereinafter, detailed description is made on operation that the head slider 109 of the embodiment suppresses the backflow in the negative pressure groove 208 caused by the flow pads 213 and 214, and suppresses the backflow occurring near an outflow end compared with the write/read element 211 on the outflow side rail 207, thereby accumulation of the lubricating oil on the flying surface is prevented, and consequently high reliability may be obtained.

Figure 4:
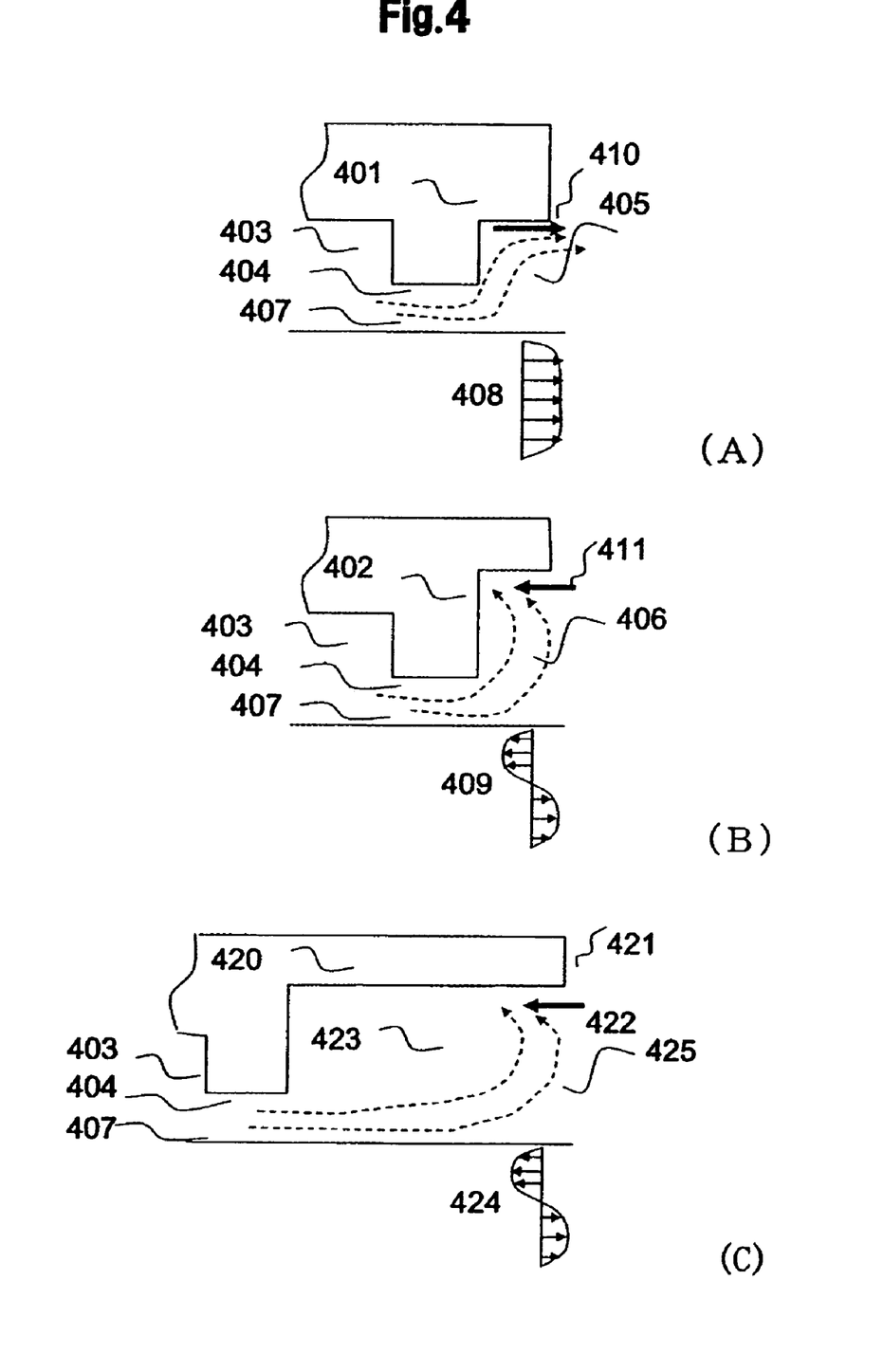
FIGS. 4(A)-4(C) are examples of a flow in the case that a groove is provided at an air outflow end of the head slider.

FIGS. 4(A), 4(B) and 4(C) show exemplary air, a droplet, or a particle 407 that flows from an inflow-side step bearing surfaces 403 of head sliders 401, 402 and 420 to outflow-end step bearing surfaces 405, 406 and 425 through rail surfaces 404, respectively. In the outflow-end step bearing surface 405, since step depth from the rail surface 404 is not large, flow velocity distribution in a height direction is shown by 408 at the relevant position. Accordingly, a flow 410 exists even in a portion directly on the outflow-end step bearing surface 405, and therefore the air, droplet, or particle 407 flows to a downstream side. On the other hand, in the outflow-end step bearing surface 406, since step depth from the rail surface 404 is large, flow velocity distribution in a height direction is shown by 409 at the relevant position. A backflow 411 exists in a portion directly on the outflow-end step bearing surface 406, resulting in accumulation of the air, droplet, or particle on the outflow-end step bearing surface 406. The head slider 420 has a relatively long negative pressure region 423. Pressure on the outflow-end step bearing surface 425 is lower than pressure on an outflow end 421 of the head slider, at which the pressure is equal to ambient pressure, due to an effect of the negative-pressure region 423. Accordingly, a backflow 422 occurs in a portion near a boundary between the region 423 and the surface 425, and therefore the air, droplet, or particle 407 cannot successively flow through an outflow end side, and consequently the air, droplet, or particle is accumulated.

Figure 6:
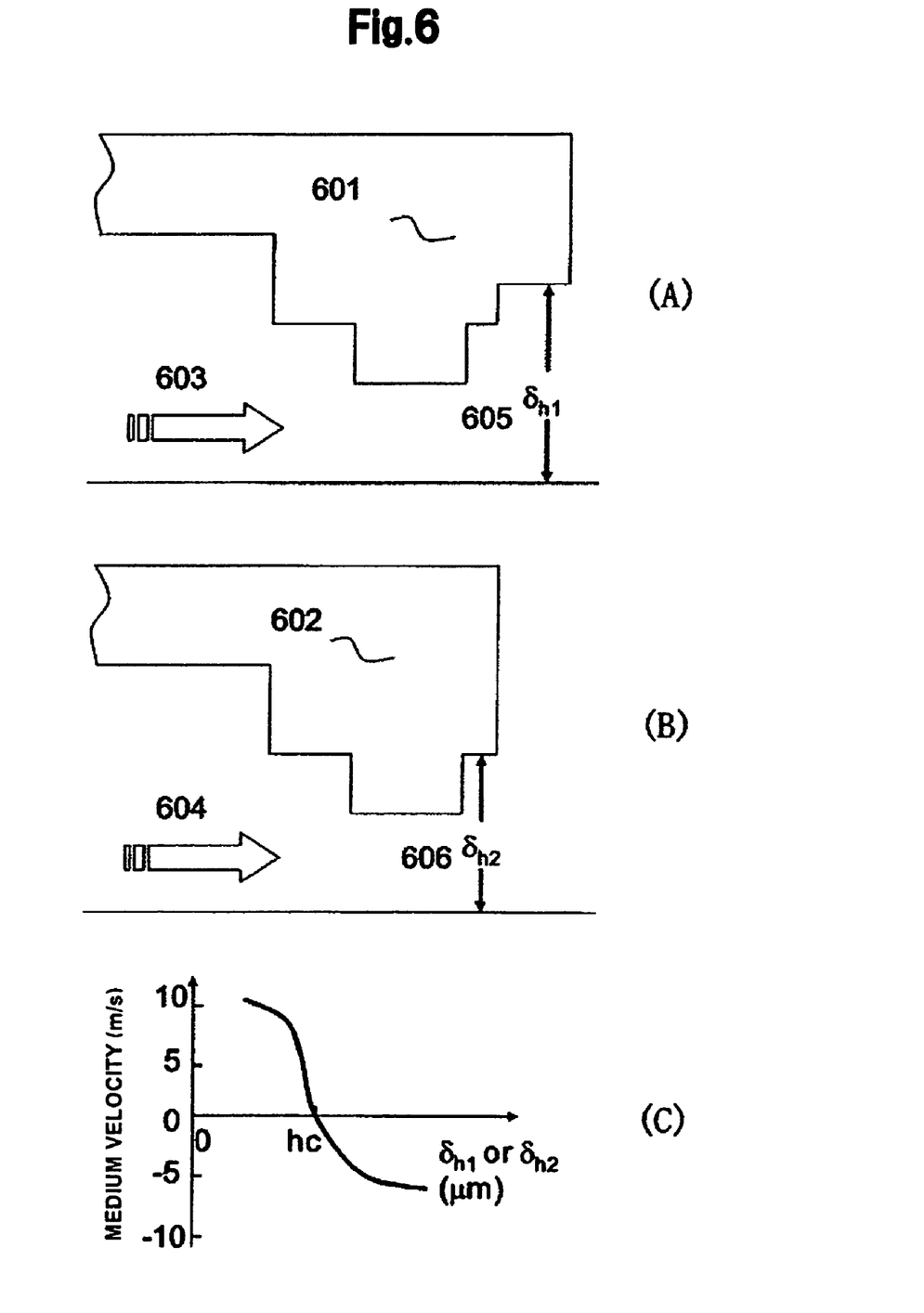
FIGS. 6(A)-6(C) are exemplary diagrams showing a relationship between groove depth and flow velocity at an outflow end of an air-bearing surface.

FIGS. 6(A) and 6(B) show exemplary air or a particle of a lubricant or the like 603 and 604, which flows on stepped surfaces of head sliders 601 and 602, respectively. Each of 605 and 606 shows depth of a groove from a rail surface to an outflow end of a head slider at an outflow side. FIG. 6(C) shows a relationship between the depth of a groove and flow velocity at the outflow side. Herein, the flow velocity means velocity of a recording medium at a place where the head slider is situated. The figure shows that when the groove depth 605 or 606 at the outflow side is increased, the flow velocity is decreased. When the depth is deeper than $h_c$ called critical depth, the flow velocity becomes negative. That is, a backflow occurs from the outflow end.

Figure 7:
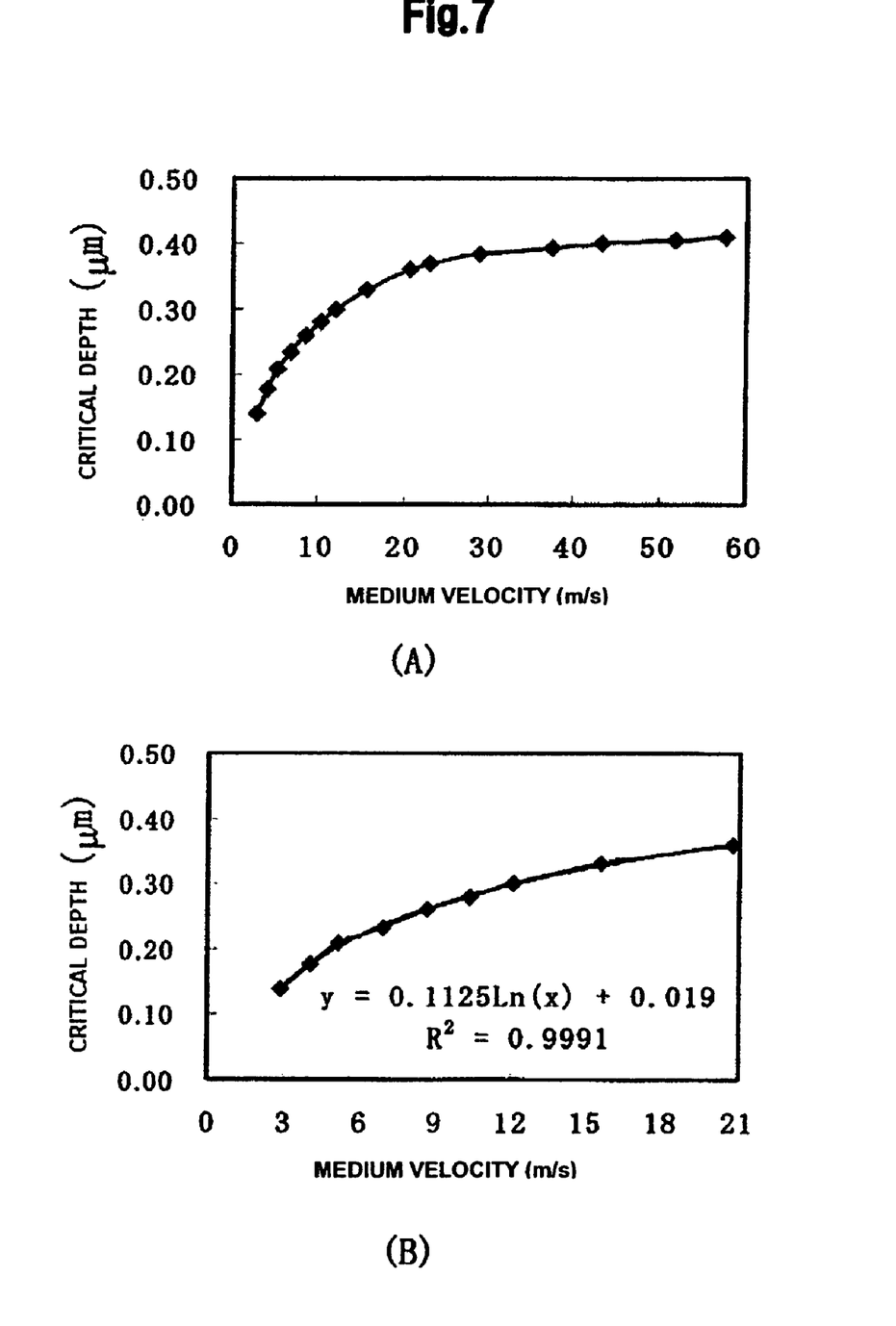
FIGS. 7(A) and 7(B) are exemplary diagrams showing a relationship between critical depth and velocity of a medium.

FIGS. 7(A) and 7(B) show exemplary diagrams showing a relationship between the critical depth and the flow velocity when a skew angle is set to be zero. In the relationship, when the flow velocity is 20 m/s or less, the critical depth depends on the flow velocity. However, when the flow velocity is more than 40 m/s, the critical depth is substantially constant, about 0.40 μm. FIG. 7(B) is an enlarged diagram of a region of flow velocity of 20 m/s or less in FIG. 7(A), in which the critical depth largely depends on the flow velocity. When a relationship between the flow velocity v and the critical depth $h_c$ in such a flow velocity region is obtained, the following is given, $$h_c = 0.1125 * \log_{10}(v) + 0.019 \quad \text{(expression 1)}.$$

Accordingly, groove depth at the rail outflow side is set to be not more than $0.1125*\log_{10}(v)+0.019$, thereby occurrence of a backflow may be prevented in a place near an outflow end compared with the rail.

Figure 8:
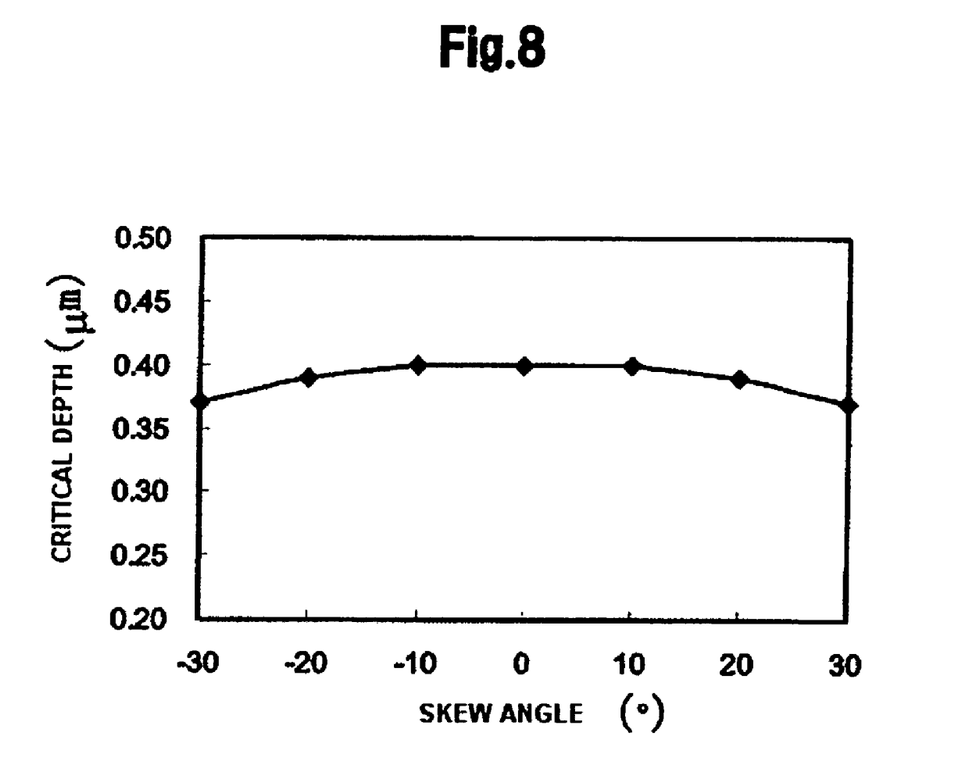
FIG. 8 is an exemplary diagram showing a relationship between the critical depth and a skew angle of a head slider.

FIG. 8 shows an exemplary diagram showing a relationship between the skew angle and the critical depth when the flow velocity is 43.3 m/s. The critical depth is substantially independent of the skew angle, and only slight change (about 20 nm) occurs in the critical depth in a range of the skew angle from −30° to 30°. Furthermore, from numerical calculation, experiments and the like by the inventor, it is confirmed that the critical depth has values as shown in FIGS. 7(A) and 7(B) while being substantially independent of a shape of the flying surface of the head slider, or flying amount (magnetic spacing amount) similarly as of the skew angle.

When consideration is made on a case that the obtained critical depth is applied to an actual magnetic disk drive, since a 3.5-inch magnetic disk drive is usually set such that a recording medium is rotated at 7,200 rpm, and flow velocity at the innermost circumference, at which the flow velocity is minimum, is about 15 m/s, if groove depth from an outflow end side of a rail to a position at an outflow end of a head slider is made to be 0.3 μm or less, occurrence of a backflow may be prevented in the relevant portion. Similarly, if the groove depth is made to be 0.25 μm or less in a 2.5-inch magnetic disk drive, and 0.15 μm or less in a 1.0-inch magnetic disk drive, the backflow may be prevented at the outflow end of the rail. That is, if the groove depth from the outflow end side of the rail to the position at the outflow end of the head slider is made to be 0.15 μm or less beforehand, the head slider may be applied to a magnetic disk drive having any size.

From these, to prevent occurrence of the backflow, groove depth at the outflow end side of the outflow side rail 207 needs to be shallower than the critical depth. That is, the respective groove depths near the outflow end compared with the write/read element as shown in FIG. 3(B) need to satisfy a relationship of $\delta_1 < \delta_2 < \delta_3 < \delta_4 < h_c$. When the width of the outflow side rail 207 is expanded to substitute the flow pads 213 and 214, a relationship of $\delta_1 = \delta_3 < \delta_2 = \delta_4 < h_c$ needs to be satisfied.

Figure 9:
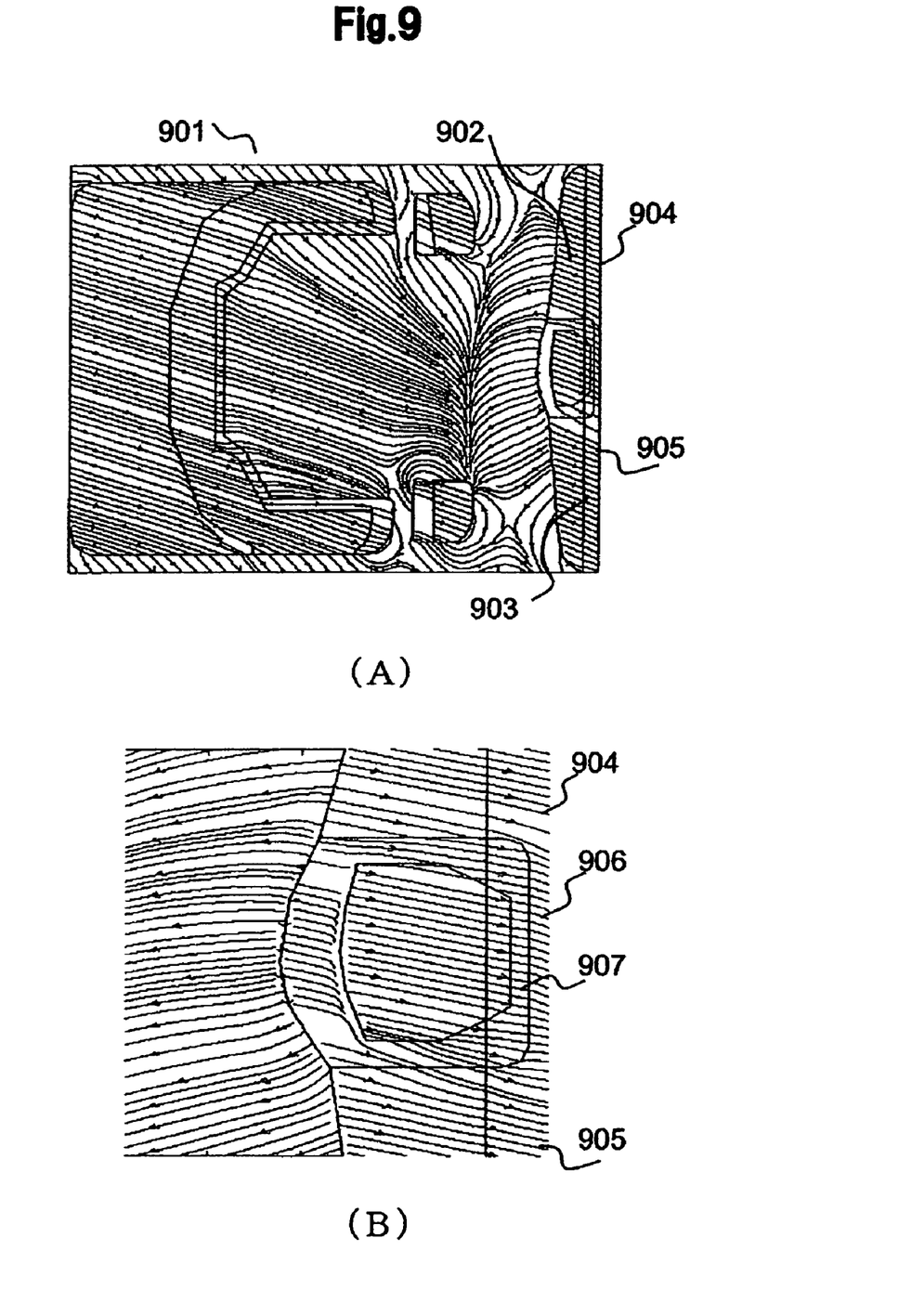
FIGS. 9(A) and 9(B) are examples of a flow in a portion near an air-bearing surface of a head slider.

FIGS. 9(A) and 9(B) show results of simulation of flow of air flowing on a portion near a surface of the head slider of the first embodiment. As shown in FIG. 9A, 902 and 903 show respective flows on portions of the flow pads 213 and 214, and 904 and 905 show respective flows on a portion near the outflow end of the outflow side rail 207. A position at which flow velocity is zero in the negative pressure groove 208 is shifted to a position near the inflow side compared with the outflow side rail 207 by the effect of the flow pads 213 and 214. This eliminates the phenomenon that a lubricant adhered to the negative pressure groove 208 flows from the position at which the flow velocity is zero into the outflow side rail 207. The position at which the flow velocity is zero is shifted to the inflow side in which the flying amount is large, thereby the accumulation of the lubricant in itself hardly occurs in the relevant portion in the groove.

As shown in FIG. 9B, 906 and 907 show exemplary respective flows on a portion near the outflow end compared with the conversion element section 211. This shows that groove depth at the outflow end side of the outflow side rail 207 is reformed, thereby a backflow does not occur even in such a portion. Accordingly, a lubricant adhered to the outflow side rail is splashed from the outflow end of the head slider to a downstream side without being accumulated on the portion, therefore a write/read error caused by falling of a droplet from the write/read element section onto the magnetic disk may be prevented.

When length of each flow pad is extremely short, air hardly flows along a surface of the flow pad, and when it is extremely long, positive pressure may occur, or each side end may easily contact to the magnetic disk. Therefore, the length is preferably made to be equal to length of the outflow end pad in a central portion. In addition, in a place at the inflow side rail 205 or places at the side rails 209 and 210, the length is preferably made shorter at a position closer to each side end such that the length is two or three times longer than length of the stepped surface 217 or 218 in FIG. 2, namely, longer than length (thickness) of the magnetic head section formed of alumina.

Figure 10:
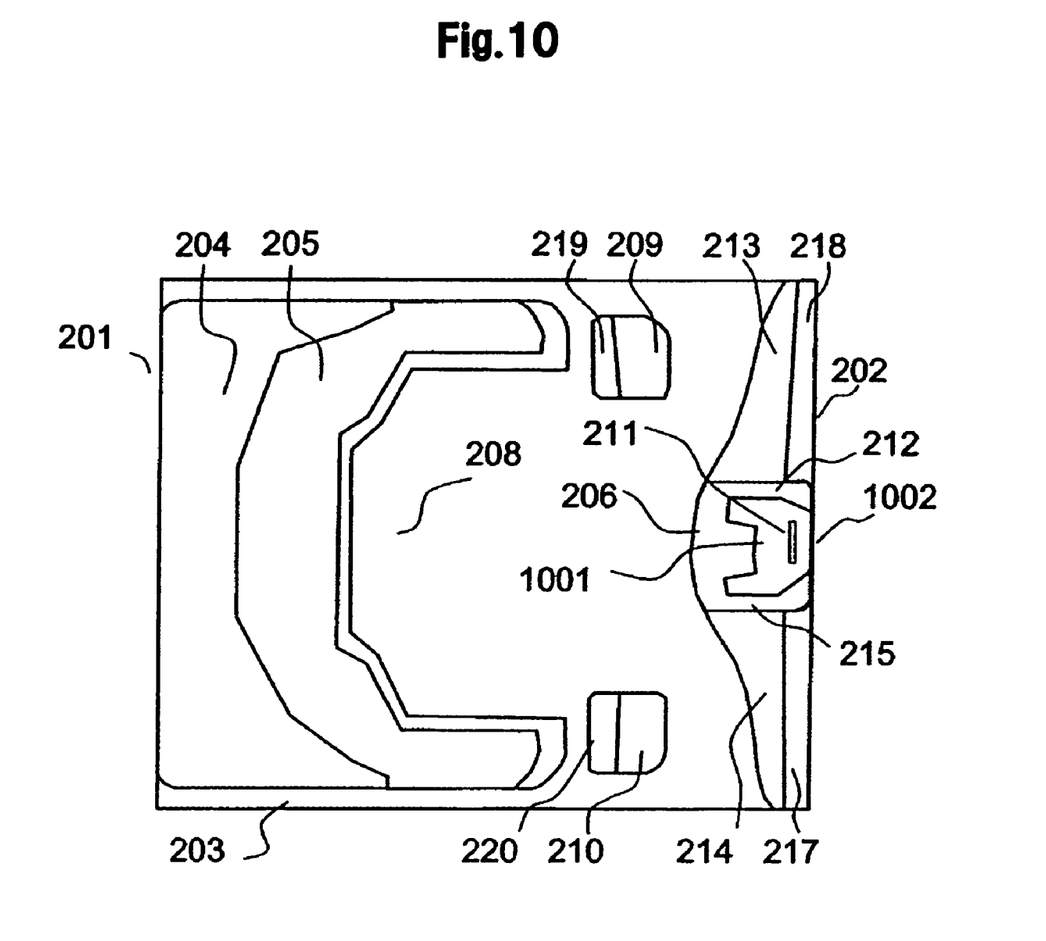
FIG. 10 is an exemplary plane diagram of an example of a magnetic head slider of a second embodiment.

FIG. 10 shows an exemplary plane diagram of a head slider of a second embodiment. The head slider of the embodiment has an air inflow end 201, air outflow end 202, and air-bearing surface 203. The air-bearing surface 203 has an inflow-side step bearing surface 204, an inflow side rail 205, and a conversion element 211, and further has an U-shaped outflow side rail 1001, an outflow-side step bearing surface 206, a negative pressure groove 208, side rails 209 and 210, side step surfaces 219 and 220, and flow pads 213 and 214. The U-shaped outflow side rail 1001 increases attenuation of velocity, so that decreases velocity dependence of flying amount. The flow pads 213, 214 and an outflow end 1002 suppress a backflow from a portion near the outflow end compared with a write/read element. In FIG. 10, a stepped portion of the outflow end 1002 near the outflow end compared with the conversion element 211 is omitted on the drawing.

Figure 11:
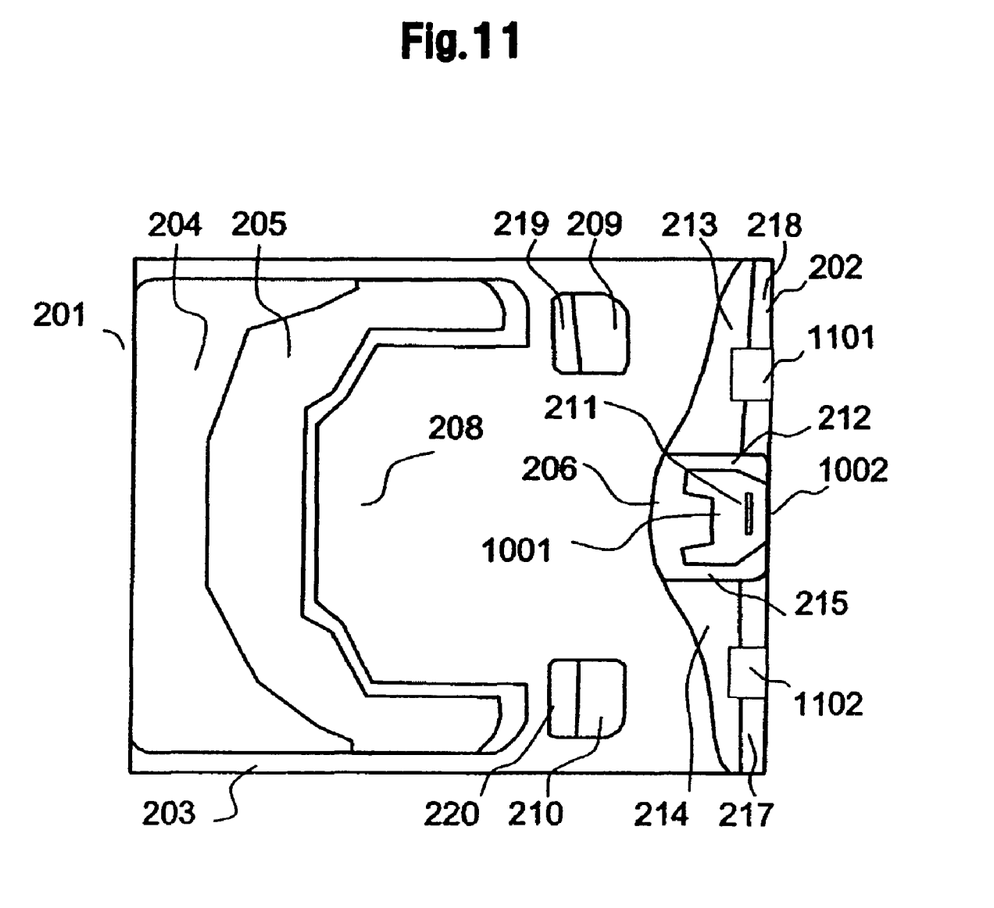
FIG. 11 is an exemplary plane diagram of an example of a magnetic head slider of a third embodiment.

FIG. 11 shows an exemplary plane diagram of a head slider of a third embodiment. The head slider of the embodiment has an air inflow end 201, air outflow end 202, and air-bearing surface 203. The air-bearing surface 203 has an inflow-side step bearing surface 204, an inflow side rail 205, and a conversion element 211, and further has an U-shaped outflow side rail 1001, an outflow-side step bearing surface 206, a negative pressure groove 208, side rails 209 and 210, side step bearing surfaces 219 and 220, and flow pads 213 and 214, wherein an outflow end 1002 near an outflow end compared with a write/read element has no stepped portion. The flow pads 213 and 214 have grooves 1101 and 1102 respectively. The grooves 1101 and 1102 change a configuration of flow on the flow pads 213 and 214 so as to increase critical depth on the flow pads 213 and 214 respectively. Again in FIG. 11, a stepped portion of the outflow end 1002 near the outflow end compared with the conversion element 211 is omitted on the drawing.

The groove depth at the outflow end side of the outflow side rail 207 and the flow pads 213 and 214 exhibit operation and effects independently of each other. As described before, the groove depth at the outflow end side of the outflow side rail 207 suppresses the backflow at the outflow end side of the outflow side rail 207, and the flow pads 213 and 214 shift the position, at which the flow velocity is zero in the negative pressure groove 208, to a side near the inflow end compared with the outflow side rail 207, thereby the flow pads suppress flowing of the lubricant adhered to the negative pressure groove into the outflow side rail 207. Accordingly, even if the flow pads 213 and 214 do not exist, the groove depth at the outflow side of the outflow side rail 207 is reformed, thereby the lubricant flowing from the negative pressure groove 208 into the outflow side rail 207 is splashed to a downstream side without being accumulated at the outflow end of the outflow side rail 207, therefore falling of droplets of the lubricant from the outflow side rail 207 may be beneficially suppressed. Moreover, even with only the flow pads 213 and 214, the lubricant may be prevented from flowing from the negative pressure groove 208 into the outflow side rail 207, leading to decrease in lubricant accumulated at the outflow end of the outflow side rail 207, therefore falling of droplets of the accumulated lubricant may be still beneficially suppressed.

When each of the side rails 209 and 210 is formed to a position near the outflow end compared with the outflow side rail 207, since a place at which the flow velocity is zero does not exist in a downstream area from each of the side rails 209 and 210, each of the flow pads 213 and 214 needs not be provided in the place. In the case of such a configuration, the flow pads 213 and 214 may be formed between the side rails 209, 210 and the outflow side rail 207.

A modification of this is given as follows. That is, in the case that even if each of the side rails 209 and 210 is formed at a side near the inflow side compared with the outflow side rail 207, a place at which the flow velocity is zero does not exist in a downstream area from each side rail, if the flow pads are provided with extending to respective positions inside the side rails 209 and 210, and preferably extending to positions at which widths of the flow pads are overlapped with each other, the flow pads 213 and 214 need not be provided over the full width of the head slider.

While the embodiments of invention were described using the examples hereinbefore, it will be appreciated that the scope of application of embodiments of the invention is not limited to the magnetic disk drive, and embodiments of the invention may be applied to any drive having a slider flying on a recording medium, for example, to an optical disk drive or a magnet-optical disk drive.

What is claimed is:

1. A disk drive having a recording medium to be rotated, and a head slider arranged in a manner of facing a surface of the recording medium wherein the head slider comprises:
   a rail surface, on which a read element for reading data recorded in the recording medium or a write element for recording data into the recording medium is mounted, provided at an outflow end side of a flying surface,
   step surfaces, which are deeper than the rail surface, provided at an inflow end side of the rail surface and at both sides thereof, and
   pad surfaces, which are deeper than the rail surface, provided at both sides of the step surfaces, wherein a depth δ from the rail surface to a position of the outflow end of the flying surface is 0.15 μm or less and satisfies, $$\delta \leq 0.1125 * \log_{10}(v) + 0.019,$$

where v is a velocity of the recording medium at a position where the head slider faces the recording medium.

2. The disk drive according to claim 1 wherein an inflow side of the rail surface is formed in a U-shape.

3. The disk drive according to claim 2 wherein:
   the head slider further has a negative pressure groove surface deeper than the pad surfaces at an inflow side of the step surfaces, and an inflow side rail enclosing an inflow side and both side portions of the negative pressure groove surface, and
   a width of the step surfaces is wider than width of the negative pressure groove at a place where the inflow side rail is provided.

4. The disk drive according to claim 2 wherein:
   the head slider further has a negative pressure groove surface, which is deeper than the pad surfaces, provided at an inflow side of the step surfaces, an inflow side rail enclosing an inflow side and both side portions of the negative pressure groove surface, and side rails provided between both side portions of the inflow side rail and a conversion element, and
   a width of the step surfaces is wider than width of the negative pressure grooves at respective places where the side rails are provided.

5. The disk drive according to claim 2 wherein the step surfaces are provided over full width of the head slider.

6. The disk drive according to claim 1 wherein the pad surfaces are provided over full width of the head slider.

7. The disk drive according to claim 6 wherein:
   the head slider further has a negative pressure groove surface, which is deeper than the pad surfaces, provided at an inflow side of the step surfaces, and an inflow side rail enclosing an inflow side and both side portions of the negative pressure groove surface, and a width of the pad surfaces is wider than width of the negative pressure groove at a place where the inflow side rail is provided.

8. The disk drive according to claim 6 wherein:
the head slider further has a negative pressure groove surface, which is deeper than the pad surfaces, provided at an inflow side of the step surfaces, an inflow side rail enclosing an inflow side and both side portions of the negative pressure groove surface, and side rails provided between both side portions of the inflow side rail and the conversion element, and
a width of the pad surfaces is wider than width of the negative pressure grooves at respective places where the side rails are provided.

9. The disk drive according to claim 6 wherein the step surfaces are provided over full width of the head slider.

10. The disk drive according to claim 9 wherein an inflow side of the rail surface is formed in a U-shape.

11. The disk drive according to claim 7 wherein:
the head slider includes a slider body section including $Al_2O_3$—TiC, and a head section including alumina provided at an outflow end side of the slider body section, and
a length of a side end portion of each of the pad surfaces is two to three times longer than length of the head section.

12. A head slider, comprising:
a rail surface, on which a conversion element is mounted, provided at an outflow end side of a flying surface,
step surfaces, which are deeper than the rail surface, provided at an inflow end side of the rail surface and at both sides thereof, and
pad surfaces, which are deeper than the rail surface, provided at both sides of the step surfaces, wherein a depth from the rail surface to a flying surface at a position of the outflow end is 0.15 µm or less.

13. The head slider according to claim 12 wherein:
the head slider further has a negative pressure groove surface, which is deeper than the pad surfaces, provided at an inflow side of the step surfaces, and an inflow side rail enclosing an inflow side and both side portions of the negative pressure groove surface, and
width of the pad surfaces is wider than width of the negative pressure groove at a place where the inflow side rail is provided.

14. The head slider according to claim 12 wherein:
the head slider further has a negative pressure groove surface, which is deeper than the pad surfaces, provided at an inflow side of the step surfaces, an inflow side rail enclosing an inflow side and both side portions of the negative pressure groove surface, and side rails provided between both side portions of the inflow side rail and the conversion element, and
a width of the pad surfaces is wider than width of the negative pressure grooves at respective places where the side rails are provided.

15. The head slider according to claim 12 wherein the pad surfaces are provided over full width of the head slider.

16. A head slider, comprising:
a rail surface, on which a conversion element is mounted, provided at an outflow end side of a flying surface,
step surfaces, which are deeper than the rail surface, provided at an inflow end side of the rail surface and at both sides thereof, and
pad surfaces, which are deeper than the rail surface, provided at both sides of the step surfaces, wherein grooves deeper than the pad surfaces are provided on the pad surfaces respectively, wherein a depth from the rail surface to the flying surface at a position of the outflow end is 0.15 µm or less.

17. The head slider according to claim 16 wherein:
the head slider further has a negative pressure groove surface, which is deeper than the pad surfaces, provided at an inflow side of the step surfaces, and an inflow side rail enclosing an inflow side and both side portions of the negative pressure groove surface, and
width of the pad surfaces is wider than width of the negative pressure groove at a place where the inflow side rail is provided.

18. The head slider according to claim 16 wherein:
the head slider further has a negative pressure groove surface, which is deeper than the pad surfaces, provided at an inflow side of the step surfaces, an inflow side rail enclosing an inflow side and both side portions of the negative pressure groove surface, and side rails provided between both side portions of the inflow side rail and the conversion element, and
width of the pad surfaces is wider than width of the negative pressure grooves at respective places where the side rails are provided.

19. The head slider according to claim 16 wherein the pad surfaces are provided over full width of the head slider.

* * * * *